United States Patent [19]

Stewart

[11] 4,283,224

[45] Aug. 11, 1981

[54] SEPARATIVE TREATMENT OF ANODE SLIME

[75] Inventor: Maxson L. Stewart, Bremen, Ga.

[73] Assignee: Southwire Company, Carrollton, Ga.

[21] Appl. No.: 146,883

[22] Filed: May 5, 1980

[51] Int. Cl.³ .................... C22B 11/04; C22B 13/04; C22B 25/00

[52] U.S. Cl. .................... 75/99; 75/101 BE; 75/108; 75/109; 75/118 R; 75/120; 75/121; 423/22; 423/24

[58] Field of Search .............. 75/99, 101BE, 108, 109, 75/118 R, 120, 121; 423/94, 91

[56] References Cited

U.S. PATENT DOCUMENTS

| | | | |
|---|---|---|---|
| 2,082,487 | 6/1937 | Frick | 423/94 |
| 2,950,964 | 8/1960 | Forward | 75/103 |
| 4,047,939 | 9/1977 | Morrison | 75/121 |
| 4,145,212 | 3/1979 | Bodson | 75/118 R |
| 4,229,270 | 10/1980 | Subramanian | 75/121 |

FOREIGN PATENT DOCUMENTS 1418391 12/1975 United Kingdom.

OTHER PUBLICATIONS

Green et al., U.S. Bureau of Mines, Report of Investigations, 7358.

Primary Examiner—Brian E. Hearn
Attorney, Agent, or Firm—Herbert M. Hanegan; Frank A. Peacock; Stanley L. Tate

[57] ABSTRACT

A hydrometallurgical process is provided for the separative treatment of electrometallurgical anode slime containing precious metals and substantial amounts of tin dioxide and lead sulfate. The process is especially suited for treatment of anode slimes from the electrorefining of secondary copper to recover about 85% of the metal value contained therein, especially tin and precious metals. First, lead is separated by leaching the slime with diethylene triamine followed by carbonation to precipitate lead carbonate with subsequent regeneration of the leach solution. Second, tin is separated by leaching the undissolved residue from the amine leach with a solution of hydrochloric acid and chlorine to dissolve substantially all substances except tin dioxide. Third, the pregnant leach solution is contacted with an exchange resin substantially selective to adsorption of precious metals except silver followed by cementation of silver from the depleted leach solution by copper addition with subsequent regeneration of the leach solution. Fourth, the loaded resin is elutriated followed by cementation of precious metals from the loaded eluate with silver from the previous step and recycling the silver-enriched solution for cementation of silver.

9 Claims, 1 Drawing Figure

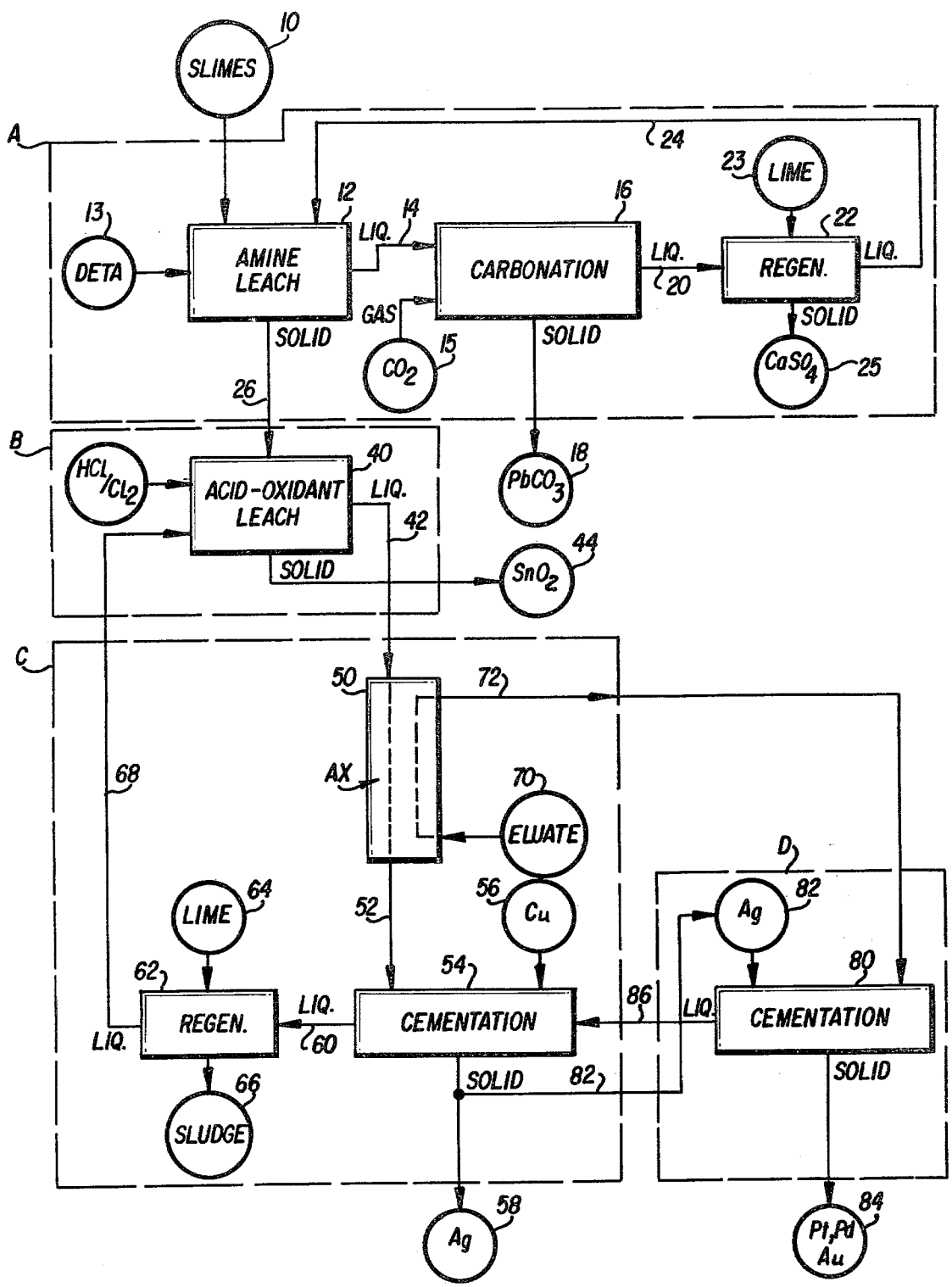

SEPARATIVE TREATMENT OF ANODE SLIME

BACKGROUND OF THE INVENTION

This invention relates generally to hydrometallurgical separation of metal values from electrometallurgical anode slime and relates specifically to recovery of tin, lead, and precious metals from anode slime resulting in the electrolytic refining of secondary copper.

In the electrolytic refining of copper, electrolytic corrosion of impure copper anodes releases associated impurities. Those impurities which are more noble than copper do not dissolve in the electrolytic solution but rather settle to the bottom of the refining tank to form the anode slime which is periodically removed from the tank and treated to recover precious and other metals.

The composition of copper anode slime will generally vary according to the source of the copper, this variation being especially apparent as between primary sources and secondary sources. Even among secondary sources, there typically will be considerable variation in anode slime composition; however, such slimes are characterized by a large percentage of lead and tin content. A typical assay includes about 70% metal consisting of about 5 to 10% precious metals, 25% tin, and 50% lead with the balance being composed of various other metals. For purposes herein, the term "precious metals" (PM's) refers primarily to platinum, palladium, gold, and silver.

There is substantial economic incentive for separating tin from the slimes, in addition to PM's, considering the relatively large portion of tin making up the slimes and the unit market value of tin, the tin value being a significant percentage of the PM value per unit weight of slimes. Apparently, conventional methods for concentrating PM's from starting materials similar to copper anode slimes either do not separate a tin concentrate or, if so, involve substantial use of energy-intensive pyrometallurgical processes to separate lead and tin. Thus, the present invention is concerned with treatment of anode slimes by energy-conservative hydrometallurgical processes to concentrate tin, as well as PM's.

Of particular interest in the present invention concerning the removal of lead is the process disclosed in U.S. Pat. No. 2,950,964 issued Aug. 30, 1960 to F. Forward et al, hereby incorporated by reference. The process concentrates lead by selective dissolution of oxidized lead compounds, especially lead sulfate, in an alkylene amine aqueous solution.

Of general interest concerning concentration of PM's are ion exchange techniques, such as is briefly described in British Pat. No. 1,418,391 issued Dec. 17, 1975, hereby incorporated by reference, wherein platinum-group metals and gold are leached from the ore with an acid and an oxidizing agent, then the loaded leach solution is contacted with an exchange resin selective to adsorption of such PM's followed by elutriation of the loaded resin with thiourea, and finally extracting the PM's from the loaded eluate by liquid-liquid extraction.

The present invention advantageously utilizes the appropriate features of these processes as components in an overall process for the hydrometallurgical treatment of copper anode slimes to separate approximately 85% of the metal value contained therein, including tin as well as PM's.

SUMMARY OF THE INVENTION

Accordingly, a hydrometallurgical process is provided for separative treatment of electrometallurgical anode slime having substantial amounts of tin dioxide and lead sulfate. Preferably, the anode slime is obtained from the electrorefining of copper and, most preferably, so secondary copper. The process comprise the following steps:

(a) providing as a starting material a PM-bearing anode slime having substantial amounts of lead sulfate and tin dioxide;

(b) recovering lead by (1) leaching said slime in an alkylene amine aqueous solution to solubilize said lead sulfate as lead-polyamine-sulfate complexes, said amine being sufficient in amount to combine with the lead present; and (2) after separating said leach solution from undissolved residue, carbonating said solution to precipitate lead carbonate;

(c) recovering tin by leaching the undissolved residue from step (b) in an aqueous solution of hydrochloric acid and chlorine to solubilize substantially all of said residue, including PM's as anionic chlorine complexes, except tin dioxide; followed by separating the tin dioxide residue;

(d) recovering silver by (1) contacting the leach solution from step (c) with an anion exchange resin substantially selective to platinum, palladium, and gold adsorption to load said resin accordingly; and (2) after separating the depleted leach solution from said resin, cementing silver from said solution by the addition of copper; and (e) recovering a mixture of platinum, palladium, and gold by (1) elutriating said loaded resin with an aqueous solution of thiourea and hydrochloric acid; then (2) cementing said PM mixture from the loaded eluate by the addition of silver from step (d) (2); and (3) after separating the PM mixture from the eluate, adding the silver-enriched eluate to the leach solution of step (d) (2) for cementation of silver.

Within the meaning of the term "substantially selective" as used in anion exchange step (d) (1), PM anion exchange resins are indicated that do not exchange silver at least to the extent that the relative quantity of silver from cementation step (d) (2) stoichiometrically exceeds the relative quantity of PM mixture from cementation step (e) (2). Because of the cooperative feedback from step (e) (3) to step (d) (2), wide latitude is permitted regarding the degree to which the exchange resin does not exchange silver.

Preferably, the alkylene amine of step (b) is diethylene triamine; and the amine leach solution is regenerated by the addition of lime to the spent solution from step (b) (2), following precipitation and separation of lead carbonate, to precipitate calcium sulfate; and, after separating said precipitate, recycling the clarified leach solution to step (b) (1).

Preferably, the leach solution of step (c) is regenerated by the addition of lime to the spent solution from step (d) (2), following cementation and separation of silver, to precipitate a base metal sludge; and, after separating said sludge, recycling the clarified leach solution to step (c).

BRIEF DESCRIPTION OF THE DRAWING

Further details are given below with reference to the accompanying flowchart illustrating the 4 major steps of a preferred mode in the treatment of copper anode slime to separate respectively lead as carbonate, tin as dioxide, silver, and a precious metal mixture.

DESCRIPTION OF THE PREFERRED EMBODIMENTS

Referring more particularly to the drawing, it is seen that the overall process of the invention may be divided broadly into four concentrating units, as indicated by dashed circumscriptions A through D. Unit A receives the anode slime starting material and through amine leaching produces lead carbonate. The undissolved residue is passed to Unit B wherein tin dioxide is concentrated as the residue of acid-oxidant leaching. The pregnant leach solution is then passed to Unit C wherein, by selective ion exchange, precious metals are removed excepting silver which is thereafter cemented from solution. The exchange resin is eluted, and the PM-loaded eluate is then passed to Unit D wherein other PM's are cemented from solution.

Unit A and appurtenant operations are fully described in U.S. Pat. No. 2,950,964, referenced above, for "... Production of Lead". In the preferred practice of this lead process, sulfide ores are preliminarily oxidized to greatly enhance solubility of the lead-containing compounds in the amine leach solution. Copper anode slimes are especially suited for treatment by this lead process since lead contained in such slimes is initially present as sulfate. Thus, in the present invention, preliminary oxidation is not required.

Copper refinery anode slimes 10, typically containing 50 to 60% lead sulfate, are leached at 12 in a polyalkylene amine aqueous solution. The amine is preferably diethylene triamine (DETA) at 13 for maximum solubility of lead sulfate and is present in an amount sufficient to combine with the lead content of the slime. Preferably, leaching is done at ambient temperature with agitation and at a DETA concentration of about 200 g/l. The lead sulfate is selectively solubilized via formation of lead-polyamine-sulfate complexes, with the DETA-to-lead molar ratio being about 1. The liquid component 14 of the leach solution containing the solubilized lead complex is separated from undissolved residue by conventional liquid-solid separation, then treated by carbonation at 16 wherein carbon dioxide gas 15 is bubbled through the solution to precipitate lead carbonate at 18. Optionally, this lead carbonate may be reduced to the metal lead (not shown) by conventional processes. The spent leach solution 20 is then separated from the lead precipitate 18 by conventional liquid-solid separation and is preferably regenerated at 22 by the addition of lime 23 to precipitate calcium sulfate 25 from the amine-sulfate complexes, thereby freeing the amine leaching agent. The regenerated solution is recycled at 24 to the leaching step 12 with any necessary adjustments for purity and concentration. The undissolved solid residue 26 from the amine leaching at 12 is passed to the next unit for separation of tin. Preferably, the solid residue is washed, for example, with dilute amine solution to remove entrained lead followed by a water wash with wash solutions being recycled to the leach solution at 12.

In Unit B, tin dioxide is separated from the undissolved residue 26 of Unit A by leaching at 40 in an aqueous solution of hydrochloric acid and chlorine to solubilize substantially all substances except tin dioxide (being virtually insoluble). Preferably, leaching is done in the temperature range of about 60° to 80° C., at a pH substantially less than 1 with the chlorine-to-acid molar ratio being about 2, and with agitation for a contact time of about 1 to 2 hours. The pregnant leach solution 42 is separated from the tin residue 44 and passed to Unit C for recovery of precious metals. The tin dioxide may optionally be reduced to the metal tin (not shown) by conventional processes.

In Unit C, the pregnant leach solution 42 containing PM-anion-complexes is contacted with a conventional anion exchange resin at 50 substantially selective to adsorption of platinum, palladium, and gold (but not silver) to remove a mixture of these PM's from the leach solution 42. Further discussion is given below (after discussing Unit D) regarding selection criteria for particular resins. A suitable resin of this type is "Srafion NMRR" (TM) available from the Ayalon Water Conditioning Company of Haifa, Israel. Preferably, resin loading is conducted at a pH of about 0.5 to 2.5 and at a temperature up to about 70° C. Another type of suitable resin is a styrene-divinyl-benzene copolymer having a resonating amino group, testing on which is reported by T. E. Green and S. L. Law, "Properties of an Ion Exchange Resin with High Selectively for Gold", Bureau of Mines Investigation 7358, hereby incorporated by reference. The silver-rich discharge solution 52 from the anion exchanger 50 is then treated by cementation at 54 with addition of copper 56 to precipitate silver 58. The spent solution 60 is regenerated at 62 by addition of lime 64 to precipitate a base-metal sludge 66. After separation of the sludge 66, the clarified solution 68 is preferably recycled to the chlorine leaching step 40 in Unit B. The PM-loaded resin at 50 is eluted in countercurrent fashion with eluate 70 suitable to remove adsorbed PM's and regenerate the resin, such as an aqueous solution of thiourea and hydrochloric acid having preferred concentrations of about 5% and about 5 ml/l respectively. The PM-loaded eluate 72 is passed to Unit D for recovery of platinum, palladium, and gold.

In Unit D, the PM-loaded eluate 72 is treated by cementation at 80 with addition of silver 82, from a portion of the cemented silver 58 in the previous operation, to precipitate a PM-mixture 84 of platinum, palladium, and gold. After separating the PM precipitate 84, the silver-enriched eluate 86 is recycled to the silver cementation step at 54 to recover silver.

It is noted that because of this cooperative feedback from Unit D to Unit C via stream 86, surprisingly wide latitude is permitted regarding the degree to which the exchange resin at 50 does not exchange silver. Ideally, the resin does not adsorb silver, i.e. the exchanger pass-through of silver via stream 52 is 100% efficient. Realistically, the silver pass-through may be substantially less than 100%, in which case any portion of silver adsorbed at 50 inertly passes, upon elutriation, via streams 72 and 86 through Unit D to silver cementation at 54. Accordingly, in selecting the particular exchange resin, all that is required is that exchange selectivity is such that the relative quantity of silver at 58 stoichiometrically exceeds the relative quantity of PM mixture at 85.

The following is a suitable procedure for carrying out an example embodying the invention: first, 300 grams of dry decopperized secondary copper anode slimes are leached in about 1 liter of 20% DETA solution for about 30 minutes to solubilize lead. Typically, such a sample will contain roughly 35% lead, 15% tin, 5% silver, 400 ppm gold, 500 ppm palladium, 20 ppm platinum, and minor amounts of various base metals. After filtering the loaded leach solution, the residue is washed with about 75 milliliters of water to remove entrained leach solution and then dried. The filtrate is placed in a beaker and bubbled with $CO_2$ gas to precipitate lead carbonate. The weight of the beaker contents is monitored, and carbonation is continued until no further weight gain is apparent. The beaker contents are then filtered to separate lead carbonate precipitate from the spent leach solution. The precipitate may be reduced with graphite to metallic lead. Milk of lime is added to the filtrate to regenerate the DETA solution by precipitating $CaSO_4$. Next, to separate tin, the initial residue obtained from the DETA leach is reacted in a chlorine leach by adding the residue to about 5 liters of HCl heated to 80°–100° C. while bubbling chlorine gas through the solution for about 4 hours. The solution is not filtered to separate $SnO_2$ insoluble residue, followed by washing and drying of the residue. Next, to separate PM's, the filtrate is contacted with about 1 liter of the anion exchange resin SRAFION NMRR. After loading, the resin is eluted with about 2 liters of aqueous solution of 5% thiourea and 5 ml/l HCl. The loaded eluate is then reacted with about 3 grams of particulate silver to cement a PM mixture from solution. The solution is filtered, and the filtrate is added to the initial discharge solution from the anion exchanger. This silver enriched solution is then reacted with about 10 grams of particulate copper at 70° C. for about 1 hour to cement silver from solution. After filtering, the desilverized solution is reacted with sufficient lime to raise the pH to about 8 to precipitate a base metal sludge and thereby to regenerate the chlorine leach solution.

While preferred embodiments of the invention have been illustrated and described, it will be recognized by those skilled in the art that the invention may be otherwise variously embodied and practiced within the scope of the following claims:

What is claimed is:

1. A hydrometallurgical process for separative treatment of electrometallurgical anode slime containing substantial amounts of tin and lead, comprising:
   (a) providing as a starting material a precious metal-bearing anode slime having substantial amounts of lead sulfate and tin dioxide;
   (b) recovering lead by (1) leaching said slime in an alkylene amine aqueous solution to solubilize said lead sulfate as lead-polyamine-sulfate complexes, said amine being sufficient in amount to combine with the lead present; and (2) after separating said leach solution from undissolved residue, carbonating said solution to precipitate lead carbonate;
   (c) recovering tin by leaching the undissolved residue from step (b) in an aqueous solution of hydrochloric acid and chlorine to solubilize substantially all of said residue, including precious metals as anionic chlorine complexes, except tin dioxide; followed by separating the tin dioxide residue;
   (d) recovering silver by (1) contacting the leach solution from step (c) with an anion exchange resin substantially selective to platinum, palladium, and gold adsorption to load said resin accordingly; and (2) after separating the depleted leach solution from said resin, cementing silver from said solution by the addition of copper; and
   (e) recovering a mixture of platinum, palladium, and gold by (1) elutriating said loaded resin with an aqueous solution of thiourea and hydrochloric acid; then (2) cementing said precious metal mixture from the loaded eluate by the addition of silver from step (d) (2); and (3) after separating the precious metal mixture from the eluate, adding the silver-enriched eluate to the leach solution of step (d) (2) for cementation of silver.

2. The process of claim 1 wherein the slime of step (a) is copper anode slime.

3. The process of claim 2 wherein said slime is secondary copper anode slime.

4. The process of claim 1, 2, or 3 further comprising regenerating the amine leach solution of step (b) (1) by the addition of lime to the spent solution from step (b) (2), following precipitation and separation of lead carbonate, to precipitate calcium sulfate; and, after separating said precipitate, recycling the clarified leach solution to step (b) (1).

5. The process of claim 1, 2, or 3 further comprising regenerating the leach solution of step (c) by the addition of lime to the spent solution from step (d) (2), following cementation and separation of silver, to precipitate a base metal sludge; and, after separating said sludge, recycling the clarified leach solution to step (c).

6. The process of claim 1, 2, or 3 wherein said amine of step (b) (1) is diethylene triamine.

7. The process of claim 6 further provided:
   in step (b) (1), the concentration of said amine is about 200 g/l and the amine-to-lead molar ratio is about 1;
   in step (c), said leaching is conducted at a temperature of about 60°–80° C. and a pH substantially less than 1 with the chlorine-to-acid molar ratio being about 2;
   in step (d) (1), said contacting is conducted at a pH of about 0.5–2.5 and at a temperature up to about 70° C.; and
   in step (e) (1), said elutriation is conducted at a concentration of about 5% thiourea and about 5 ml/l acid.

8. A hydrometallurgical process for separative treatment of secondary copper anode slime containing precious metals and substantial amounts of lead sulfate and tin dioxide, comprising:
   (a) recovering lead by (1) leaching said slime in a diethylene triamine aqueous solution to solubilize said lead sulfate as lead-polyamine-sulfate complexes, said amine being sufficient in amount to combine with the lead present; and (2) after separating said leach solution from undissolved residue, carbonating said solution to precipitate lead carbonate;
   (b) regenerating the amine leach solution of step (a) (1) by the addition of lime to the spent solution from step (a) (2), following precipitation and separation of lead carbonate, to precipitate calcium sulfate; and, after separating said precipitate, recycling the clarified leach solution to step (a) (1);
   (c) recovering tin by leaching the undissolved residue from step (a) in an aqueous solution of hydrochloric acid and chlorine to solubilize substantially all of said residue, including precious metals as anionic chlorine complexes, except tin dioxide; followed by separating the tin dioxide residue;
   (d) recovering silver by (1) contacting the leach solution from step (c) with an anion exchange resin substantially selective to platinum, palladium and gold adsorption to load said resin accordingly; and (2) after separating the depleted leach solution from said resin, cementing silver from said solution by the addition of copper; and (e) recovering a mixture of platinum, palladium, and gold by (1) elutriating said loaded resin with an aqueous solution of thiourea and hydrochloric acid; then (2) cementing said precious metal mixture from the loaded eluate by the addition of silver from step (d) (2); and (3) after separating the precious metal mixture from the eluate, adding the silver-enriched eluate to the leach solution of step (d) (2) for cementation of silver; and (f) regenerating the leach solution of step (c) by the addition of lime to the spent solution from step (d) (2), following cementation and separation of silver, to precipitate a base metal sludge; and, after separating said sludge, recycling the clarified leach solution to step (c).

9. The process of claim 8 further provided:

in step (a) (1), the concentration of said amine is about 200 g/l and the amine-to-lead molar ratio is about 1;

in step (c), said leaching is conducted at a temperature of about 60°–80° C. and a pH substantially less than 1 with the chlorine-to-acid molar ratio being about 2;

in step (d) (1), said contacting is conducted at a pH of about 0.5–2.5 and at a temperature up to about 70° C.; and in step (e) (1), said elutriation is conducted at a concentration of about 5% thiourea and about 5 ml/l acid.

* * * * *